US009361226B2

(12) United States Patent
Chapman et al.

(10) Patent No.: US 9,361,226 B2
(45) Date of Patent: Jun. 7, 2016

(54) ADJUSTING A MEMORY TRANSFER SETTING WITH LARGE MAIN MEMORY CAPACITY

(75) Inventors: Cory Allen Chapman, Durham, NC (US); William Fred Keown, Jr., Raleigh, NC (US); John Edward Long, Jr., Raleigh, NC (US); Marc Richard Pamley, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 675 days.

(21) Appl. No.: 13/428,969

(22) Filed: Mar. 23, 2012

(65) Prior Publication Data
US 2013/0254472 A1   Sep. 26, 2013

(51) Int. Cl.
G06F 12/00     (2006.01)
G06F 12/08     (2016.01)
G06F 12/02     (2006.01)

(52) U.S. Cl.
CPC ............... *G06F 12/08* (2013.01); *G06F 12/02* (2013.01)

(58) Field of Classification Search
CPC .................................................. G06F 9/4418
USPC ................................................ 711/172, 203
See application file for complete search history.

(56) References Cited

U.S. PATENT DOCUMENTS

2008/0177994 A1 * 7/2008 Mayer .............................. 713/2

OTHER PUBLICATIONS

Red Hat , Red Hat Enterprise Linux 6 Installation Guide-en-US, 2010,UVM.EDU, Edition 1, section 9.14.5.1.*
Microsoft, You cannot put a computer that has more than 4 GB of memory into hibernation in Windows XP and in Windows Server 2003, 2007, Internet.*
Wikipedia, Advanced Configuration and Power Interface, 2007, Internet.*

* cited by examiner

*Primary Examiner* — Reginald Bragdon
*Assistant Examiner* — Hannah A Faye-Joyner
(74) *Attorney, Agent, or Firm* — Kunzler Law Group (57) ABSTRACT

An apparatus for adjusting a memory transfer setting includes a storage device storing machine-readable code and a processor executing the machine-readable code. The machine-readable code includes a determination module determining that an amount of main memory exceeds a threshold percentage of secondary storage on an information handling device. The machine readable code also includes an adjustment module adjusting a memory transfer setting on the information handling device in response to the determination module determining that the amount of main memory exceeds the threshold percentage.

16 Claims, 6 Drawing Sheets

ADJUSTING A MEMORY TRANSFER SETTING WITH LARGE MAIN MEMORY CAPACITY

BACKGROUND

1. Field

The subject matter disclosed herein relates to adjusting a memory transfer setting and more particularly relates to adjusting a memory transfer setting in response to large main memory capacity.

2. Description of the Related Art

Many information processing systems include main memory that is directly accessible by a processor. In addition, these computing systems also typically include secondary storage for non-volatile storage of data. Historically, the amount of secondary storage has often greatly exceeded the amount of main memory.

However, the amount of main memory that a chipset can support has grown tremendously with each new generation. In addition, capacity of main memory itself has increased as vendors have improved their technology.

BRIEF SUMMARY

Based on the foregoing discussion, the inventors have recognized a need for an apparatus, system, and method that adjusts a memory transfer setting, such as disabling a memory transfer sleep state or modifying a page file. Beneficially, such an apparatus, system, and method would adjust the memory transfer setting responsive to detecting that an amount of main memory exceeds a threshold compared to an amount of secondary storage.

The embodiments of the present subject matter have been developed in response to the present state of the art, and in particular, in response to the problems and needs in the art that have not yet been fully solved by currently available information handling devices. Accordingly, the embodiments have been developed to provide a method, apparatus, and system for adjusting a memory transfer setting that overcome many or all of the above-discussed shortcomings in the art.

An apparatus is provided with a storage device storing machine-readable code, a processor executing the machine-readable code, and a plurality of modules configured to functionally execute the steps for adjusting a memory transfer setting. These modules in at least a portion of the described embodiments include a determination module and an adjustment module.

In one embodiment, the determination module determines that an amount of main memory exceeds a threshold compared to an amount of secondary storage on an information handling device. In one embodiment, the adjustment module adjusts a memory transfer setting on the information handling device in response to the determination module determining that the amount of main memory exceeds the threshold.

A method is also presented; in the disclosed embodiments, the method substantially includes the steps to carry out the functions presented above with respect to the operation of the described apparatus. In one embodiment, the method includes determining that an amount of main memory exceeds a threshold compared to an amount of secondary storage on an information handling device. In one embodiment, the method includes disabling a memory transfer sleep state on the information handling device in response to determining that the amount of main memory exceeds the threshold.

A computer program product including a storage device storing machine readable code executed by a processor to perform operations is also presented. In one embodiment, the operations include determining that an amount of main memory exceeds a threshold compared to an amount of secondary storage on an information handling device. In one embodiment, the operations include disabling a memory transfer sleep state on the information handling device in response to determining that the amount of main memory exceeds the threshold.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
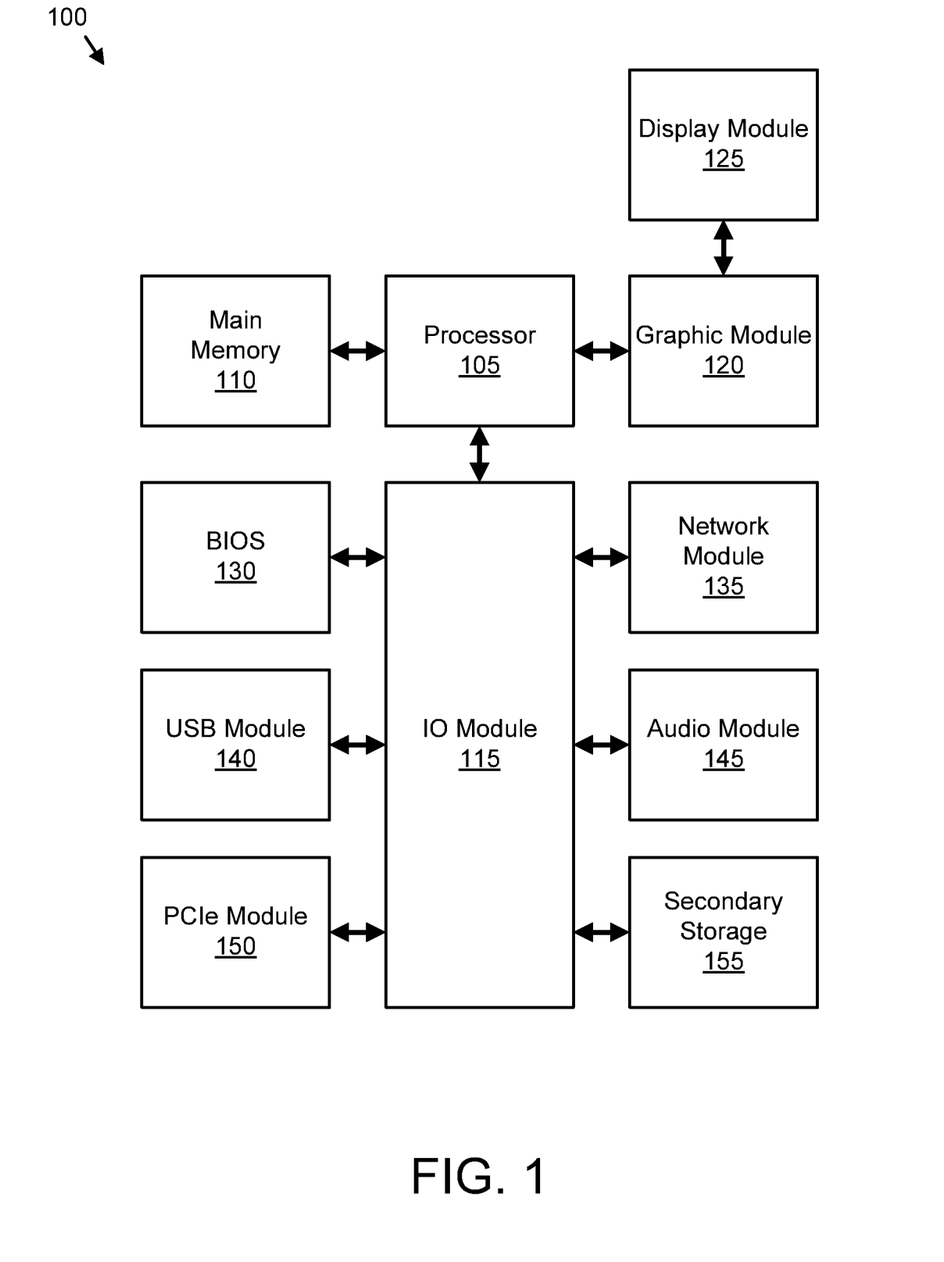
FIG. 1 is a schematic block diagram illustrating one embodiment of a information handling device in accordance with the present subject matter.

FIG. 1 is a schematic block diagram illustrating one embodiment of an information handling device 100. The information handling device 100 includes a processor 105, a main memory 110, an IO module 115, a graphics module 120, a display module 125, a basic input/output system ("BIOS") 130, a network module 135, a universal serial bus ("USB") module 140, an audio module 145, a peripheral component interconnect express ("PCIe") module 150, and secondary storage 155. One of skill in the art will recognize that other configurations of an information handling device 100 or multiple information handling devices 100 may be employed with the embodiments described herein.

The processor 105, main memory 110, IO module 115, graphics module 120, display module 125, BIOS 130, network module 135, USB module 140, audio module 145, PCIe module 150, and secondary storage 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The main memory 110 stores computer readable programs. Main memory may include volatile memory such as dynamic random access memory ("DRAM") and static random access memory ("SRAM"). Main memory may include one or more storage media, such as one or more dual in-line memory modules ("DIMM"s) of volatile memory. Each DIMM may comprise a series of volatile memory integrated circuits.

The processor 105 executes the computer readable programs as is well known to those skilled in the art. The computer readable programs may be tangibly stored in secondary storage 155. The secondary storage 155 may comprise at least one Solid State Device ("SSD"). In addition, the secondary storage 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS 130, the network module 135, the PCIe module 150, and the secondary storage 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS 130 may communicate instructions through the IO module 115 to boot the information handling device 100, so that computer readable software instructions stored on the secondary storage 155 can load, execute, and assume control of the information handling device 100. The BIOS 130 may comprise a coded program embedded on a chipset that recognizes and controls various devices that make up the information handling device 100. The BIOS 130 may refer to various approaches to providing a firmware interface for booting an information handling device 100, including traditional BIOS, unified extensible firmware interface (UEFI), Open Firmware, and others. The BIOS 130, in one embodiment, includes a storage device that stores the relevant instructions for booting. The storage device may be a solid state storage device, such as Flash memory. The BIOS 130 may be a solid state storage device with relevant code that is attached to a motherboard of the information handling device.

The network module 135 may communicate with the IO module 115 to allow the information handling device 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
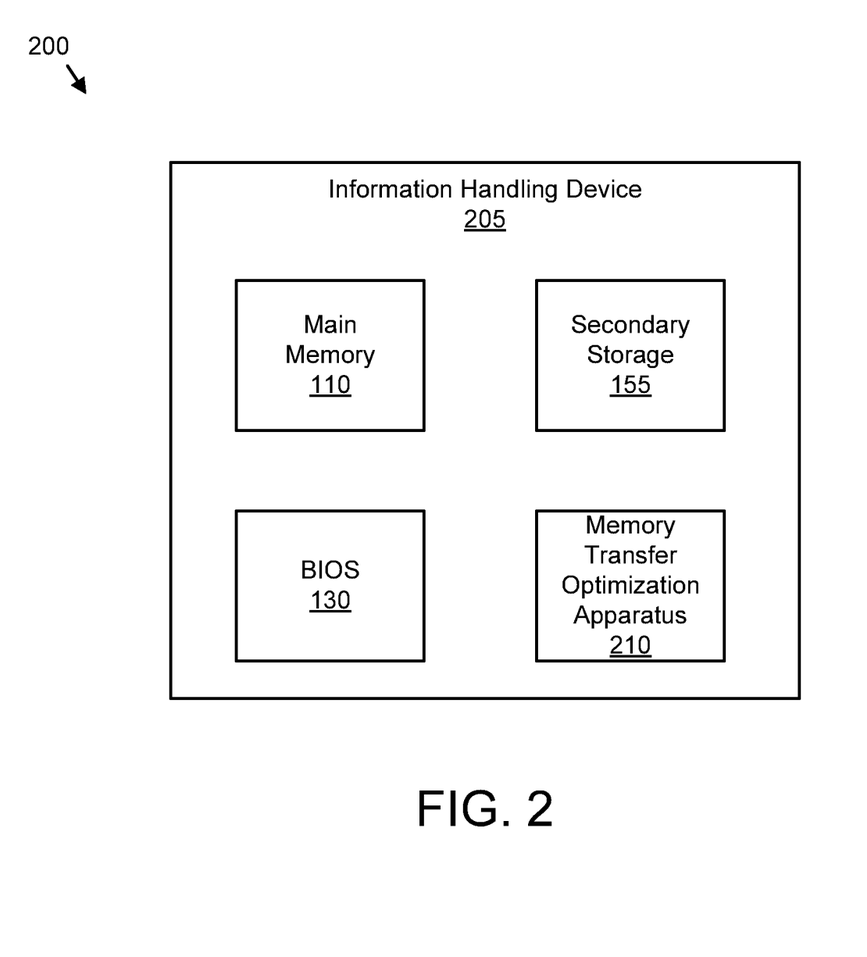
FIG. 2 is a schematic block diagram illustrating one embodiment of a system for adjusting a memory transfer setting in accordance with the present subject matter.

FIG. 2 illustrates one embodiment of a system 200 for adjusting a memory transfer setting. The system 200 includes an information handling device 205 with main memory 110, secondary storage 155, a BIOS 130, and a memory transfer optimization apparatus 210. The main memory 110, BIOS 130, and secondary storage 155 may comprise embodiments of and/or are substantially similar to the like numbered elements in FIG. 1.

Similarly, the information handling device 205, in certain embodiments, may comprise the information handling device 100 depicted in FIG. 1 and/or include at least a portion of the components of the information handling device 100. The information handling device 205 may be embodied as a portable or handheld electronic device and/or portable or handheld computing device such as a personal desktop assistant ("PDA"), a tablet computer, a slate or pad computer, an e-Book reader, a mobile phone, a smartphone, and the like. In other embodiments, the information handling device 205 may be embodied as a desktop computer, a portable computer, a server, a mainframe computer, and/or the like. In one embodiment, the information handling device 205 includes an operating system that includes computer readable programs executing on the information handling device 205 for managing resources and operation of the information handling device 205. The operating system may include, but is not limited to, a Windows® operating system, a Linux operating system, and/or other suitable operating systems.

Unexpected problems may occur in information handling devices 205 with large amounts of main memory 110—specifically, in information handling devices 205 with an amount of main memory 110 that exceeds secondary storage 155 by a certain amount. Problems may arise in operations and functions in which data is copied or transferred from main memory 110 to secondary storage 155 such as certain sleep or hibernate states and the use of page files for virtual memory swapping.

Certain sleep states involve a transfer of data from main memory 110 to secondary storage 155. One such memory transfer sleep state is an Advanced Configuration and Power Interface ("ACPI") S4 state supported by Microsoft® Windows® operating systems. When an information handling device 205 prepares to enter into an S4 state, it writes data stored in main memory 110 to secondary storage 155 so that while in the S4 state, power to main memory 110 can be removed to decrease overall power consumption in the sleep state. Upon resume from S4, the information handling device 205 reads the data from secondary storage 155 back into main memory 110 and the information handling device 205 may be resumed to the state it was prior to entering the S4 state. A problem may occur if there is too much information in memory such that it overflows the available space on the secondary storage 155 during the transfer of data. This can result in slow performance entering in and out of the S4 state and/or a crash of the operating system on the information handling device 205.

Operating systems such as Windows® operating systems often set up a page file as means to increase performance. A page file is a section of the secondary storage 155 that is set aside to be used in conjunction for main memory 110 swapping to improve overall performance. An operating system may store data from main memory 110 to secondary storage 155 (on the page file) to free up more room on main memory 110. The amount of space set aside on the secondary storage 155 to be used with swapping typically depends on the amount of main memory 110 installed. Larger amounts of main memory 110 usually yield larger page files. A large amount of main memory 110 may lead to massive page file sizes that can severely reduce available space on secondary storage 155, especially if the information handling device 205 includes smaller secondary storage 155.

Therefore, the information handling device 205 includes a memory transfer optimization apparatus 210. The memory transfer optimization apparatus 210, in one embodiment, determines whether an amount of main memory 110 exceeds a threshold compared to an amount of secondary storage 155 on an information handling device 205. The memory transfer optimization apparatus 210, in one embodiment, adjust a memory transfer setting on the information handling device 205 if the memory transfer optimization apparatus 210 determines that the amount of main memory 110 exceeds the threshold. The memory transfer optimization apparatus 210 may adjust the memory transfer setting by disabling a memory transfer sleep state and/or modify a page file.

In one embodiment, the memory transfer optimization apparatus 210 is in communication with, is integrated with, is a modification of, and/or resides in the BIOS 130. In one embodiment, the memory transfer optimization apparatus 210 comprises a coded program embedded on a chipset or a computer readable program stored on a storage device of the BIOS 130. In one embodiment, the memory transfer optimization apparatus 210 comprises application software. In this embodiment, the memory transfer optimization apparatus 210 may comprise a computer readable programs tangibly stored in secondary storage 155 and/or main memory 110 that is executed by a processor 105 (e.g. of the information handling device 205). In one embodiment, a portion of the memory transfer optimization apparatus 210 is part of and/or in communication with the BIOS 130 and a portion of the memory transfer optimization apparatus 210 is application software. In one embodiment, the memory transfer optimization apparatus 210 is integrated with and/or in communication with the operating system. In other embodiments, the memory transfer optimization 210 apparatus is embodied in other suitable forms.

Figure 3:
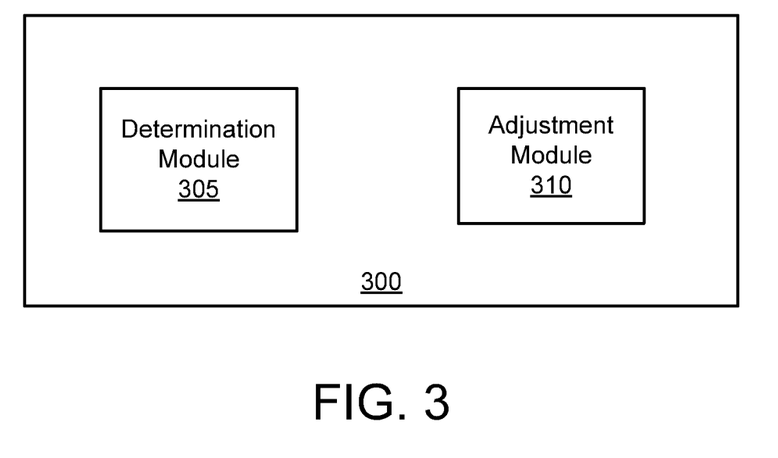
FIG. 3 is a schematic block diagram illustrating one embodiment of an apparatus for adjusting a memory transfer setting in accordance with the present subject matter.

FIG. 3 illustrates one embodiment of an apparatus 300 for adjusting a memory transfer setting. The apparatus 300 may comprise one embodiment of the memory transfer optimization apparatus 210 depicted in FIG. 2. The apparatus 300 includes a determination module 305 and an adjustment module 310.

The determination module 305, in one embodiment, determines whether an amount of main memory 110 exceeds a threshold compared to an amount of secondary storage 155 on an information handling device 205. In one embodiment, the amount of secondary storage 155 is an amount of secondary storage capacity and the determination module 305 determines that the amount of main memory 110 exceeds the threshold based on the secondary storage 155 capacity. Capacity of the secondary storage 155 may equal total capacity (e.g. the determination module 305 may determine that a 64 gigabyte ("GB") hard disk drive ("HDD") has a secondary storage 155 capacity of 64 GB).

In one embodiment, the amount of main memory 110 compared to the amount of secondary storage 155 is measured based on available storage space of the secondary storage 155. An amount of available storage space may comprise an amount of storage that is available on secondary storage 155 for storage of data and may be a subset of total storage capacity (e.g. 50 GB of a 64 GB drive is full so the determination module 305 determines that the available storage space is 14 GB).

In one embodiment, the determination module 305 references a plurality of thresholds and determines whether the amount of main memory 110 exceeds one of the thresholds compared to the amount of secondary storage 155. In one embodiment, in determining whether to modify a page file, the determination module 305 may reference three thresholds—one for no action to be taken, one to limit the page file size, and one to eliminate the page file.

In one embodiment, the determination module 305 determines that the amount of main memory 110 exceeds the threshold compared to the amount of secondary storage 155 using a table. Specifically, the determination module 305 may reference a table stored in a database, a flat file, a coded program embedded on a chipset, on a storage device associated with the BIOS 130, or any suitable data structure and/or format.

Table 1 depicts one embodiment of a table for the determination module 305 to reference in determining whether the amount of main memory 110 exceeds the threshold:

TABLE 1

| Secondary Storage Amount | Main Memory Amount | Memory Transfer Sleep State |
|---|---|---|
| 64 GB | Any | Disabled |
| 128 GB | >34 GB | Disabled |
| 160 GB | >52 GB | Disabled |
| 250 GB | >104 GB | Disabled |
| 256 GB | >108 GB | Disabled |
| 300 GB | >132 GB | Disabled |
| 320 GB | >144 GB | Disabled |
| 450 GB | >218 GB | Disabled |
| 500 GB | >246 GB | Disabled |
| 512 GB | >254 GB | Disabled |
| 600 GB | >304 GB | Disabled |

In one embodiment, the determination module 305 references Table 1 when the apparatus 300 determines whether to disable a memory transfer sleep state. In one embodiment, the determination module 305 references the amount of secondary storage 155 capacity (e.g. 128 GB) and references the corresponding amount of main memory 110 in the table (e.g. 34 GB) to determine whether the amount of main memory 110 exceeds the threshold. If the amount of main memory 110 is greater than the amount specified in the table, the determination module 305, in one embodiment, determines that the amount of main memory 110 exceeds the threshold.

Table 2 depicts another embodiment of a table for the determination module 305 to reference in determining whether the amount of main memory 110 exceeds the threshold:

TABLE 2

| Secondary Storage Amount | Main Memory Amount | Action |
|---|---|---|
| <=256 GB | Memory <=8 GB | None |
| | Memory >8 GB but <=24 GB | Limit page file size to 2 GB |
| | Memory >24 GB | Disable page file |

In one embodiment, the determination module 305 references Table 2 when the apparatus 300 determines whether to modify a page file. In one embodiment the table includes a plurality of thresholds, each with an associated action. In Table 2, for an amount of secondary storage 155 less than or equal to 256 GB, the determination module 305 may reference Table 2 for the amount of main memory 110, and signal the adjustment module 310, described below, to act according to the triggered threshold.

In one embodiment, the determination module 305 determines whether the amount of main memory 110 exceeds the threshold using a function. In one embodiment, the determination module 305 uses a function for a determination of whether to disable the memory transfer sleep state. One embodiment of such a function is as follows:

$$RAM = (AMHDS - 66.3)/1.75$$

where AMHDS is Absolute Minimum Hard Drive Size (in GB) and RAM is total RAM installed in the information handling device 205 (in GB).

In one embodiment, the determination module 305 uses a percentage and/or a ratio of main memory 110 to secondary storage 155. Specifically, for determining whether to modify the page file, in one embodiment, the determination module 305 may determine a ratio of main memory 110 to secondary storage 155 by dividing the amount of main memory 110 by the amount of secondary storage 155 (e.g. if the amount of main memory is 8 GB and the amount of secondary storage is 256, the ratio would be 0.03125). In one non-limiting embodiment, a first threshold is a ratio of main memory 110 to secondary storage 155 less than or equal to 0.03125, in which no action is taken, a second threshold is a ratio greater than 0.03125 but less than 0.09375, in which the size of the page file may be limited, and a third threshold of a ratio greater than 0.09375 in which the page file is disabled or otherwise eliminated. In certain embodiments, other suitable ratios may be used.

The adjustment module 310, in one embodiment, adjusts a memory transfer setting on the information handling device 205 in response to the determination module 305 determining that the amount of main memory 110 exceeds the threshold. The adjustment module 310 may receive a signal from the determination module 305 to adjust the memory transfer setting.

In one embodiment, the memory transfer setting controls a memory transfer sleep state. In one embodiment, the adjustment module 310 adjusting the memory transfer setting includes the adjustment module 310 disabling a memory transfer sleep state on the information handling device 205. As used herein, a memory transfer sleep state is a sleep state that transfers data from main memory 110 to the secondary storage 155 in connection with entering a sleep state. In one embodiment, the memory transfer sleep state comprises an Advanced Configuration and Power Interface ("ACPI") S4 state. In other embodiments, other sleep or hibernate states in which data is transferred from main memory 110 to secondary storage 155 may also be examples of a memory transfer sleep state.

In one embodiment, the adjustment module 310 disables the memory transfer sleep state during boot time. In one embodiment, the adjustment module 310 disables the memory transfer sleep state on the information handling device 205 in the Advanced Configuration and Power Interface ("ACPI") settings. Specifically, the adjustment module 310 may disable the memory transfer sleep state by not entering the memory transfer sleep state as an option in the ACPI settings during boot time. For example, as part of booting an information handling device 205, the BIOS 130 enters supported power states into the ACPI table. The adjustment module 310 may disable the memory transfer sleep state by not entering S4 as a supported power state in the ACPI table at boot time.

In one embodiment, the adjustment module 310 comprises application software. In this embodiment, the adjustment module 310 may disable the memory transfer sleep state using an Application Programming Interface ("API") provided by the operating system, driver, and/or the like of the information handling device 205. In one embodiment, the adjustment module 310 may disable the memory transfer sleep state by invoking a command line utility. Specifically, in one embodiment, with a Windows® operating system, the adjustment module 310 invokes a command on a Powercfg.exe tool (e.g. –hibernate off).

In one embodiment, the adjustment module 310 adjusting the memory transfer setting includes the adjustment module 310 modifying a page file for swapping data between main memory 110 and the secondary storage 155. In one embodiment, the adjustment module 310 modifies the page file by limiting and/or changing a size of the page file and/or disabling the page file. In one embodiment, the adjustment module 310 modifies the page file according to the threshold amount of main memory 110 compared to secondary storage 155 identified in a table or according to a ratio or percentage of main memory to secondary storage as described above. Referring to Table 2, the determination module 305 may determine that main memory 110 exceeds 8 GB but is under 24 GB and the adjustment module 310 may limit the page file size to 2 GB in response. The determination module 305 may determine that main memory 110 exceeds 24 GB and the adjustment module 310 may disable the page file in response.

In one embodiment, the adjustment module 310 comprises application software. In this embodiment, the adjustment module 310 may modify the page file using an API provided by the operating system, driver, and/or the like of the information handling device 205.

Figure 4:
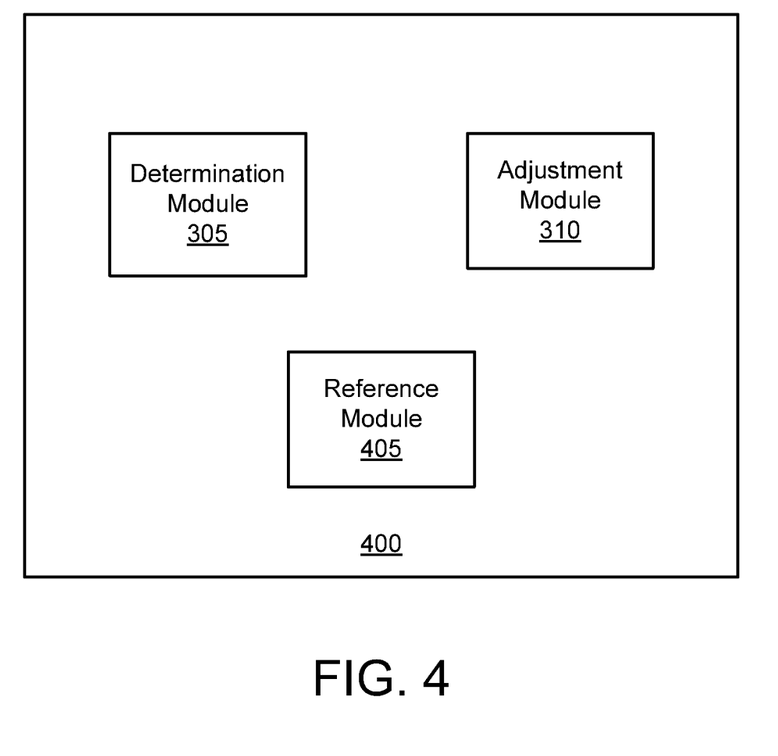
FIG. 4 is a detailed schematic block diagram illustrating another embodiment of an apparatus for adjusting a memory transfer setting in accordance with the present subject matter.

FIG. 4 illustrates another embodiment of an apparatus 400 for adjusting a memory transfer setting. The apparatus 400 may comprise one embodiment of the memory transfer optimization apparatus 210 depicted in FIG. 3. The apparatus 400 includes the determination module 305 and the adjustment module 310, which may be substantially similar to the like named modules of FIG. 3. In addition, the apparatus 400 includes a reference module 405.

The reference module 405, in one embodiment, references the amount of main memory 110 of the information handling device 205 and capacity of the secondary storage 155 and/or available storage space of the secondary storage 155 and provides these values to the determination module 305. The reference module 405, in one embodiment, is integrated with and/or in communication with the BIOS 130 and references secondary storage capacity and the amount of main memory 110 using data structures and commands available to the BIOS 130. Specifically, in one embodiment, the reference module 405 references an amount of main memory 110 using one or more ACPI functions which return the amount of main memory 110 for the information handling device 205. In one embodiment, the reference module 405 references an amount of secondary storage 155 of the information handling device 205 using one or more commands according to an AT Attachment ("ATA") storage interface. In another embodiment, the reference module 405 is embodied as application level software and references an amount of main memory 110 and capacity and/or available space on secondary storage 155 using an operating system Application Programming Interface ("API") that returns main memory information and secondary storage information in response to a function call according to the API.

Figure 5:
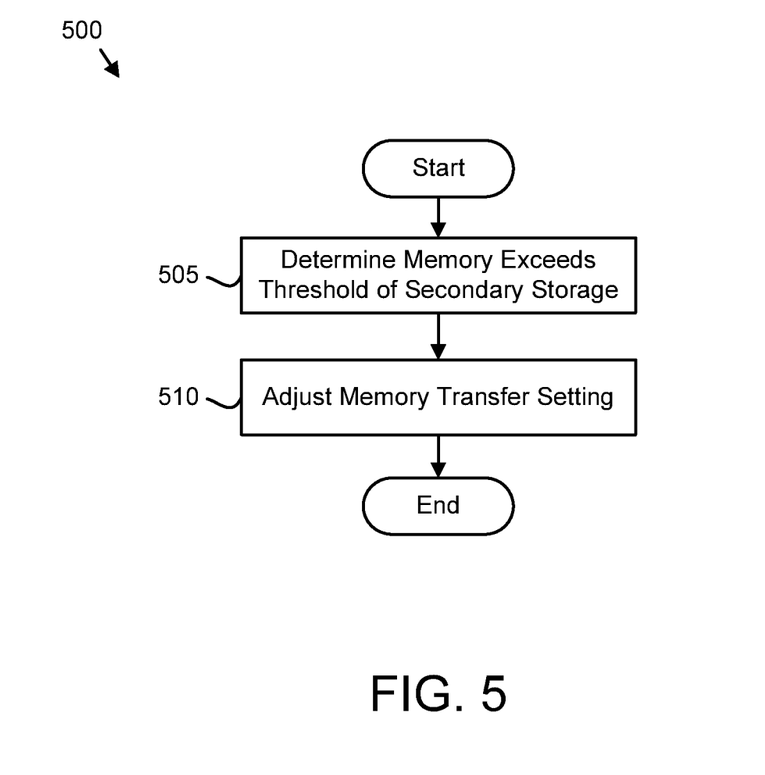
FIG. 5 is a schematic flow chart diagram illustrating one embodiment of a method for adjusting a memory transfer setting in accordance with the present subject matter.

FIG. 5 illustrates one embodiment of a method 500 for adjusting a memory transfer setting. The method 500 may implement at least a portion of the functions of the apparatus 300 of FIG. 3. The description of the method 500 refers to elements of FIGS. 1-4, like numbers referring to like elements. The method 500 begins and the determination module 305 determines that an amount of main memory 110 exceeds a threshold compared to an amount of secondary storage 155 on an information handling device 205. Next, the adjustment module 310 adjusts a memory transfer setting on the information handling device 205. Then, the method 500 ends.

Figure 6:
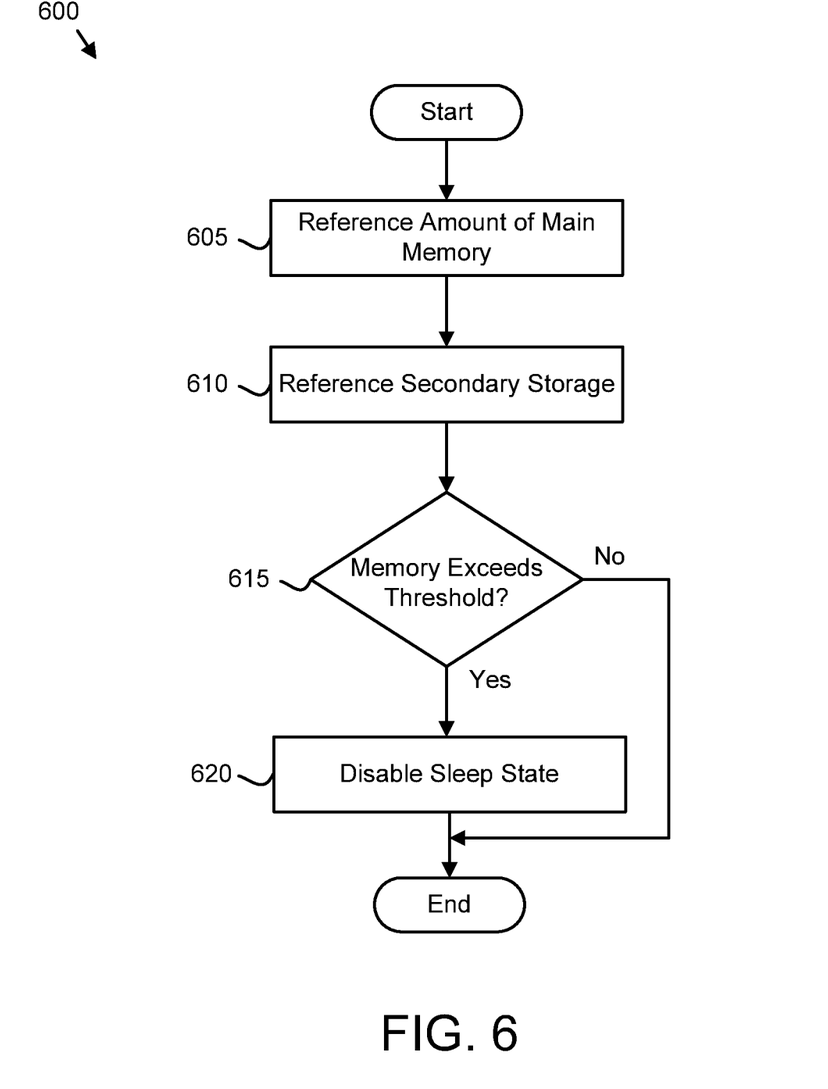
FIG. 6 is a detailed schematic flow chart diagram illustrating one embodiment of a method for disabling a sleep state in accordance with the present subject matter.

FIG. 6 illustrates one embodiment of a method 700 for disabling a sleep state. The method 600 may implement at least a portion of the functions of the apparatus 300 of FIG. 3 or the apparatus 400 of FIG. 4. The description of the method 600 refers to elements of FIGS. 1-4, like numbers referring to like elements.

The method 600 begins and the reference module 405 references 605 an amount of main memory 110 on an information handling device 205. Next, the reference module 405 references 610 a capacity of secondary storage 155 for the information handling device 205. The determination module 305 determines 615 whether the amount of main memory 110 exceeds a threshold compared to an amount of secondary storage 155. If the determination module 305 determines 615 that the amount of main memory 110 does not exceed the threshold, the method 600 ends. Alternatively, if the determination module 305 determines 615 that the amount of main memory 110 exceeds the threshold, the adjustment module 310 disables 620 a memory transfer sleep state on the information handling device 205. Then, the method 600 ends.

Figure 7:
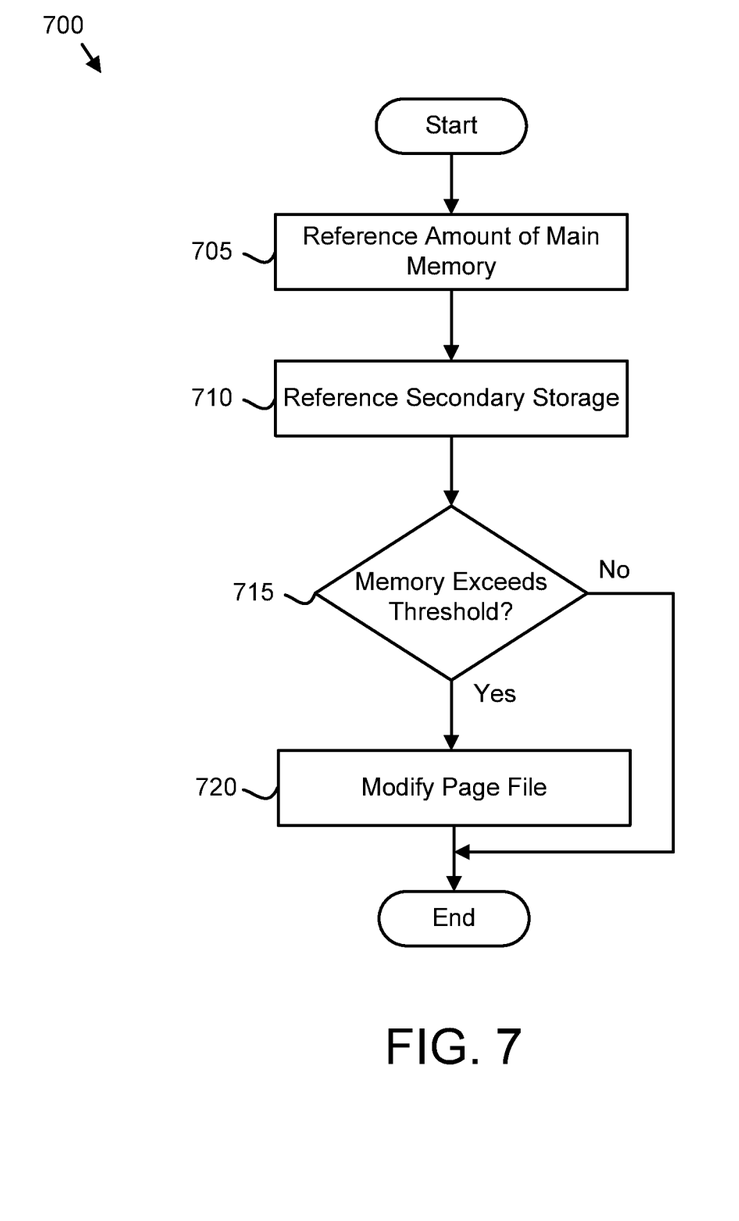
FIG. 7 is a detailed schematic flow chart diagram illustrating one embodiment of a method for modifying a page file in accordance with the present subject matter.

FIG. 7 illustrates one embodiment of a method 700 for modifying a page file. The method 700 may implement at least a portion of the functions of apparatus 300 of FIG. 3 or the apparatus 400 of FIG. 4. The description of the method 700 refers to elements of FIGS. 1-4, like numbers referring to like elements.

The method 700 begins and the reference module 405 references 705 an amount of main memory 110 on an information handling device 205. Next, the reference module 405 references 710 a capacity of secondary storage 155 for the information handling device 205. The determination module 305 determines 715 whether the amount of main memory 110 exceeds a threshold compared to an amount of secondary storage 155. In one embodiment, the determination module 305 may determine whether the amount of main memory 110 exceeds one of a plurality of thresholds as described above. If the determination module 305 determines 715 that the amount of main memory 110 does not exceed a threshold, the method 700 ends. Alternatively, of the determination module 305 determines 715 that the amount of main memory 110 exceeds a threshold, the adjustment module 310 modifies 720 a page file on the information handling device 205 according to the threshold the amount of main memory 110 exceeded. In one embodiment, modifying the page file includes limiting a size of the page file in response to the amount of main memory 110 exceeds a first threshold. In one embodiment, modifying the page file includes disabling the page file in response to the amount of main memory 110 exceeding a second threshold. Then, the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing machine-readable code;
a processor executing the machine-readable code, the machine-readable code comprising:
a determination module determining that a ratio of an amount of main memory to a secondary storage for an information handling device exceeds a threshold; and
an adjustment module adjusting a memory transfer setting on the information handling device in response to the determination module determining that the ratio exceeds the threshold.

2. The apparatus of claim 1, wherein the adjustment module adjusting the memory transfer setting further comprises the adjustment module disabling a memory transfer sleep state on the information handling device, wherein the memory transfer sleep state transfers data from main memory to the secondary storage in connection with entering a sleep state.

3. The apparatus of claim 2, wherein the adjustment module disables the memory transfer sleep state on the information handling device in the Advanced Configuration and Power Interface ("ACPI") settings.

4. The apparatus of claim 2, wherein the memory transfer sleep state comprises an Advanced Configuration and Power Interface ("ACPI") S4 state.

5. The apparatus of claim 1, wherein the adjustment module adjusting the memory transfer setting further comprises the adjustment module modifying a page file for swapping data between main memory and the secondary storage.

6. The apparatus of claim 5, wherein the adjustment module modifies the page file by one of limiting a size of the page file and disabling the page file.

7. The apparatus of claim 1, further comprising a reference module referencing the amount of main memory of the information handling device and one or more of the storage capacity of the secondary storage and an available storage space of the secondary storage.

8. A method comprising:
determining that a ratio of an amount of main memory to a secondary storage for an information handling device exceeds a threshold; and
disabling a memory transfer sleep state on the information handling device in response to determining that the ratio exceeds the threshold.

9. The method of claim 8, wherein the memory transfer sleep state transfers data from main memory to the secondary storage in connection with entering a sleep state.

10. The method of claim 8, wherein disabling the memory transfer sleep state further comprises disabling the memory transfer sleep state on the information handling device in the Advanced Configuration and Power Interface ("ACPI") settings.

11. The method of claim 8, wherein the memory transfer sleep state comprises an Advanced Configuration and Power Interface ("ACPI") S4 state.

12. The method of claim 8, further comprising referencing the amount of main memory of the information handling device and the storage capacity of the secondary storage of the information handling device.

13. A computer program product comprising a non-transitory computer-readable storage medium storing machine readable code executed by a processor to perform the operations of:
determining that a ratio of an amount of main memory to a secondary storage for an information handling device exceeds a threshold;
disabling a memory transfer sleep state on the information handling device in response to determining that the ratio of exceeds the threshold.

14. The computer program product of claim 13, wherein the memory transfer sleep state transfers data from main memory to the secondary storage in connection with entering a sleep state.

15. The computer program product of claim 13, wherein disabling the memory transfer sleep state further comprises disabling the memory transfer sleep state on the information handling device in the Advanced Configuration and Power Interface ("ACPI") settings.

16. The computer program product of claim 13, wherein the memory transfer sleep state comprises an Advanced Configuration and Power Interface ("ACPI") S4 state.

* * * * *